United States Patent [19]

Pastore

[11] Patent Number: 4,588,267
[45] Date of Patent: May 13, 1986

[54] COMBINATION REAR VIEW MIRROR AND DIGITAL CLOCK

[76] Inventor: Ronald Pastore, 149 Heathcote Rd., Lindenhurst, N.Y. 11757

[21] Appl. No.: 571,820

[22] Filed: Jan. 18, 1984

[51] Int. Cl.⁴ .......................... G02B 5/08; B60R 1/12; G04B 47/02
[52] U.S. Cl. ...................................... 350/600; 368/10; 340/98
[58] Field of Search ................. 350/600, 601; 368/10, 368/278; 340/98

[56] References Cited

U.S. PATENT DOCUMENTS

| | | | |
|---|---|---|---|
| 1,522,241 | 1/1925 | Hennessey | 350/600 |
| 1,689,471 | 10/1928 | Andrusis | 350/601 |
| 1,884,759 | 10/1932 | Hodny | 350/601 |
| 2,016,763 | 10/1935 | Alexander | 350/601 |
| 2,534,877 | 12/1950 | Owen | 368/10 |
| 2,580,014 | 12/1951 | Gazda | 350/601 |
| 4,499,451 | 2/1985 | Suzuki et al. | 340/98 |

FOREIGN PATENT DOCUMENTS

| | | | |
|---|---|---|---|
| 654088 | 12/1962 | Canada | 368/10 |
| 622710 | 12/1935 | Fed. Rep. of Germany | 350/601 |
| 1555783 | 5/1970 | Fed. Rep. of Germany | 350/600 |
| 682283 | 5/1930 | France | 368/10 |
| 728534 | 7/1932 | France | 368/10 |
| 44414 | 1/1935 | France | 368/10 |

*Primary Examiner*—Jon W. Henry
*Attorney, Agent, or Firm*—Richard L. Miller

[57] ABSTRACT

An improved rear view mirror which may contain any of a wide variety of indicator instruments such as a clock, speedometer, etc. Use of this improved mirror improves driving safety in that the driver does not have to divert his attention and visual eye contact downward to see a normal instrument cluster. Instruments are easily connected and installed and, if necessary, removed by means of removable back plate and sliding pressure contacts. The instruments may be illuminated for ease of night time viewing.

5 Claims, 6 Drawing Figures

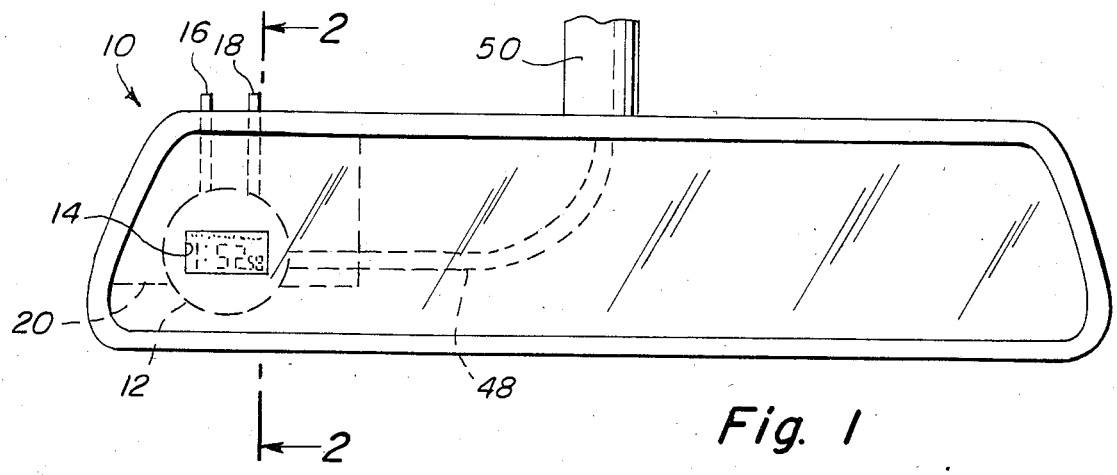
Fig. 1
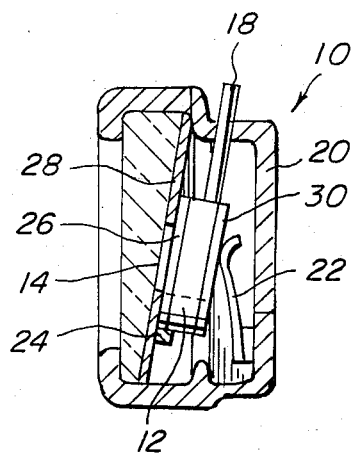
Fig. 2
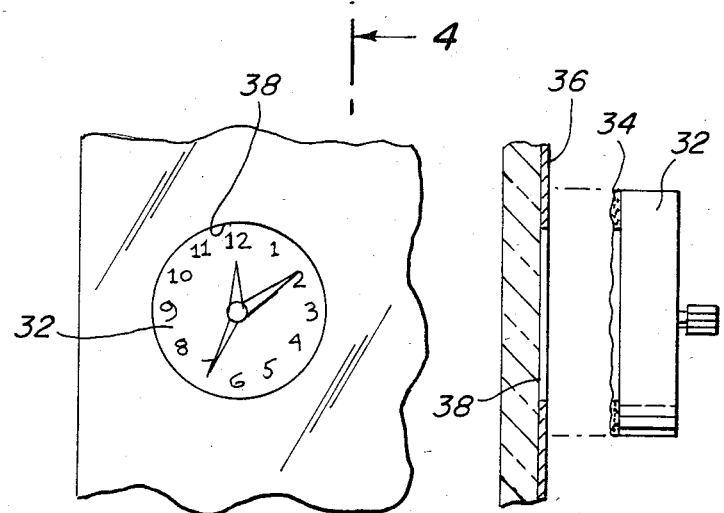
Fig. 3
Fig. 4
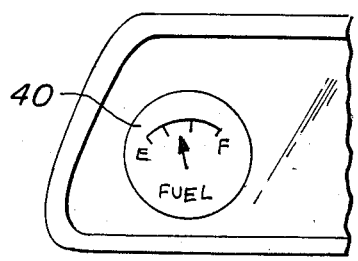
Fig. 5
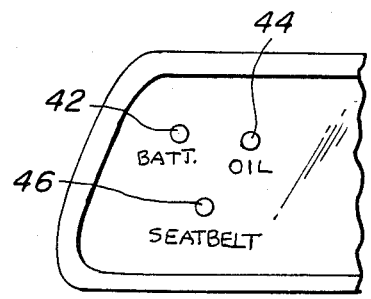
Fig. 6

COMBINATION REAR VIEW MIRROR AND DIGITAL CLOCK

BACKGROUND OF THE INVENTION

The present invention generally relates to an improvement of rear view mirrors to allow the incorporation and integration of any of a number of measuring instruments. Present practice in automotive instrumentation is to include such common measuring instruments as the odometer, clock, speedometer, fuel gauge, battery indicator, and many additional instruments into a cluster located directly in front of or slightly to the right of the driver and below the steering wheel. While this is a convenient place for instrument location, it does present the driver with a problematic choice: while in motion does he risk taking his eyes off traffic to check his gauges, or risk speeding or running out of fuel?

SUMMARY OF THE PRESENT INVENTION

It is therefore a primary object of the present invention to provide an improved rear view mirror which allows the driver of any motor vehicle to frequently observe important gauges without diverting his eyes from traffic. Most drivers routinely check their rear view mirror to check for approaching cars etc. This requires little or no loss of eye contact with forward traffic. At this same instant of time, through the use of the present invention, the driver could also check his gauges or clock.

A further object is to provide for the transmittal of power and data to and from the indicating instrument. All instruments require some sort of ground connection. This may be accomplished by providing each instrument with a ground ring which comes into intimate contact with the grounded silvered surface of the mirror itself. Power and data connections may be made by utilizing a multiplicity of electrically active regions on the case of the instrument as power inputs and output connections to which are assured by using pressure contact clips. The connecting cables may then be attached to these clips, fed through the body of the mirror and may then exit the mirror through a hollow mirror mounting column.

A further object is to make the display easily visible to the driver. This is accomplished by removing the silvering that would otherwise block the instrument from view. This removed silvering then forms a window. The display itself may be illuminated by means of a pilot lamp or light emitting display.

A yet further object is to make the instrument easy to install into the mirror and easy to remove should the instrument require repair. This is accomplished by means of a removable back plate which also contain any necessary openings for access to instrument setting and/or adjustment controls.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a front view of the motor vehicle rear view mirror with the invention incorporated therein.

FIG. 2 is a cross sectional view taken along line 2—2 in FIG. 1.

FIG. 3 is a partial front view of a wall mirror or the like with a modified form of the invention attached thereto.

FIG. 4 is an exploded cross sectional view taken along line 4—4 in FIG. 3 showing how the time piece is attached by clear adhesive to the rear surface.

FIG. 5 is a partial front view of a rear view mirror shown with the invention installed in the embodiment of a fuel gauge.

FIG. 6 is a partial front view of a rear view mirror shown with the invention installed in the embodiment of a cluster of on-off light indicators.

DETAILED DESCRIPTION OF THE PREFERRED EMBODIMENT

The present invention may be more readily understood with reference to the drawing figures. In FIG. 1 the invention is shown with the installed instrument as digital clock 12. The digital display of clock 12 is visible through window 14 which represents a region where mirror silvering has either been removed or was never deposited. Typical time setting and control buttons 16 and 18 are seen protruding above the top of the invention 10.

FIG. 2 shows how the clock 12 may actually be mounted into the invention 10. First, removable back plate 20 is removed. Digital clock 12 is slipped into place under pressure clip 22 until its hits the end of insertion stop 24. Every electrical measuring instrument requires a ground connection. This is accomplished by providing the digital clock 12 with a ground ring 26 which is in intimate electrical contact with grounded silvered surface 28 thereby providing a secure ground. Power to digital clock 12 is supplied through contact of an insulated pressure clip 22 an an electrically active region 30 of the digital clock 12.

The connections then proceed from typical pressure clip 22, through typical cable 48, through hollow mirror mounting column 50 and thereby to the instrument console of the motor vehicle.

It may be seen that this system of connection may provide for a multiplicity of connections thereby allowing the use of many different kinds of indicators and the use of multiple indicators.

FIG. 3 represents an application of the invention to a wall mounted clock in which the clock may be analog or digital. Furthermore, FIG. 4 shows how an optically transparent adhesive 34 may be applied to secure this clock 32 to silvered surface 36 without obscuring window 38.

FIG. 5 shows an alternative embodiment of the invention 10 in which the indicating instrument is a fuel gauge 40. FIG. 6 shows another alternative embodiment of the invention in which the indicating instrument is a cluster of on-off indicator lamps such as battery lamp 42, oil pressure lamp 44 and seat belt indicator lamp 46.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A rear view mirror for use in motor vehicles comprising in combination a frame supporting a mirror with a grounded reflective silvered surface on the back of the mirror, an indication instrument means for transmitting power and data to said indicating instrument, means for making said indicating instrument visible to a user of said rear view mirror, means for attaching said indicating instrument to said rear view mirror including access means for accessing instrument controls and adjustments on the indicating instrument and removal means for removal of said indicating instrument, said means for transmitting power and data to said measuring instrument further comprising a ground connection to a car's electrical system by means of direct contact between a ground ring on said measuring instrument and said grounded reflective silvered surface on said mirror; at least one pressure clip which contacts electrically active regions on the indicating instrument in such a manner as to assure low resistance electrical contact and sufficient numbers of conductors to transmit said data and power; and a cable with a multiplicity of conductors which is connected on one end to said pressure clips and exits said rear view mirror.

2. A rear view mirror, as recited in claim 1, wherein said indicating instrument consists of a digital clock.

3. A rear view mirror, as recited in claim 1, wherein said indicating instrument consists of an analog clock.

4. A rear view mirror, as recited in claim 1, wherein said means for making said indicating instrument visible to a user of said rear view mirror comprises removing an appropriate area of silvering on said grounded reflective silvered surface of said mirror so as to form a window.

5. A rear view mirror, as recited in claim 1 wherein said means for attaching said indicating instrument to said rear view mirror comprises a removable back plate and an end of insertion stop.

* * * * *